United States Patent Office 3,236,720
Patented Feb. 22, 1966

3,236,720
METHOD FOR INCREASING FLEXURAL
STRENGTH OF PAPER
William F. Tousignant and Henry A. Huber, Midland,
Mich., assignors to The Dow Chemical Company, Midland, Mich., a corporation of Delaware
No Drawing. Filed Apr. 14, 1960, Ser. No. 22,138
2 Claims. (Cl. 162—163)

The present invention relates to a process for the production of fibrous composition boards having a ligninous binder incorporated therein consisting of the precipitate obtained by treating waste liquors of the sulfite pulping processes with a polymeric alkylene polyamine.

The problem of providing uses for waste sulfite liquors has been a constant challenge to the paper industry. Relevant to the present invention are those applications involving the ligninous constituent of these liquors. For example, U.S. Patents 2,534,908 and 2,846,431 teach that a binder useful in the preparation of composition board can be provided by methods involving the treatment of waste sulfite liquors with water-soluble albuminous substances or ammonia followed by oxidation of the resulting reaction product with gaseous oxygen at an elevated temperature.

It is a principal object of the invention to provide a novel method for the utilization of the ligninous constituent of waste sulfite liquors. A second object is to provide an effective ligninous binder for the manufacture of fibrous composition board. A further object is to provide a composition board having improved strength and weathering properties. Other objects will become apparent hereinafter as the invention is more fully described.

In accordance with the present invention, a fibrous composition board is prepared by incorporating a binder into a cellulose fiber aggregate, said binder comprising the ligninous precipitate obtained by treating a waste sulfite liquor with a polymeric alkylene polyamine, forming a felted mat from the fiber-binder slurry thus prepared and subjecting the felted mat to a suitable curing schedule.

The ligninous binder of the invention can be incorporated into the cellulose fiber aggregate by any convenient means such as by spraying or directly mixing an aqueous solution thereof into the fibers. Most advantageously, however, the ligninous binder is formed in situ in a slurry of cellulose fibers such as is employed in a wet felting process for the production of fibrous composition board. A detailed description of the wet felting process is found in Stamm and Harris, Chemical Processing of Wood, Chapter 11, Chemical Publishing Company, Inc., New York, New York (1953).

In regard to the in situ formation of the binder precipitate, the present invention affords two distinct modes of operation. In one mode of operation, a predetermined quantity of waste sulfite liquor is mixed with an aqueous slurry of cellulose fibers in a manner so as to provide a homogeneous solution thereof. Normally, the resulting slurry will have a pH within the range from about 2.5 to about 7. With slurries having a pH in said range, polymeric alkylene polyamine is added to the slurry thereby precipitating the desired ligninous binder on the cellulose fibers. A schematic flow diagram of the above operation is as follows:

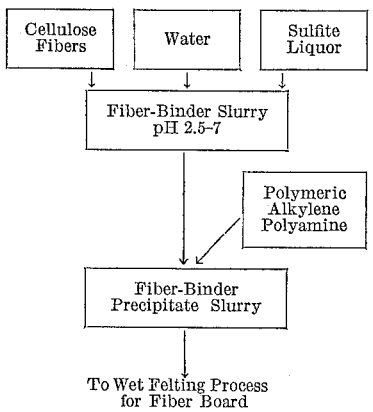

The order of addition of the foregoing precipitate-forming ingredients can be reversed, i.e., the waste sulfite liquor is added to an aqueous slurry of cellulose fibers containing a predetermined quantity of the water-soluble polymeric alkylene polyamine precipitating agent.

In a second mode of operation, the ligninous component of the waste sulfite liquor and the polymeric alkylene polyamine are dissolved in an aqueous slurry of cellulose fibers which is characterized by a pH from about 8 to about 10. Such a pH range can be achieved by the addition of sodium or potassium hydroxide either before or after the addition of the polymeric alkylene polyamine. After having formed a homogeneous solution of the precipitate-forming ingredients by thorough mixing, the pH of the solution-fiber slurry is then decreased to a pH within the range from about 2.5 to about 6, preferably about 4, by the addition of a mineral acid such as sulfuric or hydrochloric acids thereby precipitating the ligninous binder on the cellulose fibers. Composition boards made by the second mode of operation have physical properties superior to those obtained by the first described method. A schematic flow diagram of the foregoing operation is as follows:

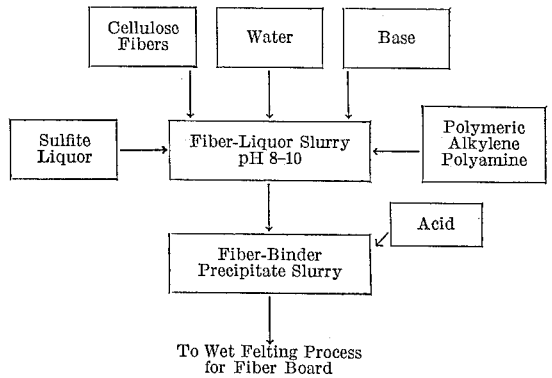

Waste sulfite liquors that are by-products of sulfite pulping processes containing lignosulfonic acids or salts thereof can be employed in the present invention. Exemplary waste sulfite liquors are those obtained from calcium base pulping of soft- or hardwood, consolidated ammonium base pulping of soft- or hardwood and the like pulping processes. More specifically, the waste liquors are by-products of processes in which lignocellulose materials are cooked in a solution of sulfurous acid and a sulfite salt of a pulping base cation such as sodium, calcium, ammonium or magnesium ions. Detailed information on the sulfite pulping process is given in Hagglund, Chemistry of Wood, Chapter V, Academic Press, Inc., New York, New York (1951).

Precipitation of the lignosulfonic acid components contained in by-product liquors from the foregoing processes can be accomplished by means of the invention in the presence of inorganic materials and carbohydrates which are also found in the crude liquor by-product as well as in modified lignosulfonate products. Also, precipitation can be accomplished in very dilute as well as concentrated solutions of the lignosulfonic acids. Generally, when the lignosulfonic acids are precipitated in situ as binders for composition boards, sufficient waste sulfite liquor is added to the fiber slurry to provide from about 1 to about 50 percent by weight of the cellulose fibers of lignosulfonic acid.

The water-soluble polymeric alkylene polyamine precipitating agent is a condensation reaction product of approximately equimolar proportions of a dihalogenated lower alkylene such as alkylene dichloride and a polyamine or mixture of polyamines. It is to be understood that equimolar proportions refer to the total moles of a dihalogenated lower alkylene and the total moles of the polyamine or mixtures thereof that are reacted. This reaction takes place upon contact of the reacting ingredients at room temperature and it is sufficiently exothermic that care should be taken not to mix the reactants too fast. Generally, water is added to the reaction mixture as a refluxing solvent in order to control the temperature of reaction and to permit refluxing of the reaction mixture to obtain a substantial conversion of the reactants. The condensation product is a water-soluble, halo acid salt of a non-linear, polymeric alkylene polyamine. This polymeric alkylene polyamine salt can be converted to a full amine by washing it with an aqueous solution of an alkali metal hydroxide such as a 50 percent solution of sodium hydroxide and then separating the immiscible polyamine and aqueous alkali metal hydroxide phases. However, the salt form of the polymeric alkylene polyamine is effective in the present invention and for purposes of this specification and the appended claims, the terminology "polymeric alkylene polyamine" shall be construed as being inclusive of both the halo acid salt and amine forms of the above-described reaction product.

Dihalogenated lower alkylenes that can be employed either singly or as mixtures include ethylene dichloride, propylene dichloride, ethylene dibromide, propylene dibromide and the like.

Polyamines or mixtures thereof that can be employed are represented generically by the following formula:

wherein $n$ is an integer from 2 to 3 and $x$ is an integer from 2 to 6.

The amount of polymeric alkylene polyamine employed to precipitate the lignosulfonic acid component of the waste sulfite liquor is a function of the quantity of ligninous binder that is ultimately desired in the fiber board and the concentration of lignosulfonic acid in the fiber slurry. Having specified the particular quantity of ligninous binder to be used, the amount of polymeric alkylene polyamine needed varies inversely with the concentration of lignosulfonic acid in the fiber slurry. Generally, in the practice of the present invention, it has been found that good results are obtained when the amount of polymeric alkylene polyamine employed is within the range from about 0.05 to about 20 percent by weight of the cellulose fibers.

Cellulose fiber aggregates that are suitable for use in the preparation of fiber board in conjunction with the present invention can be obtained by means of one or more of the conventional mechanical and chemical processes for manufacturing cellulose fibers. Exemplary of mechanically processed fiber stock is that which is prepared in an attrition mill or interplane grinder. Such means involve grinding wood chips and wood waste between rotating discs to provide a fiber pulp. Another process utilizes steam pressure to facilitate defibration with a minimum of shearing or cutting of the cellulose fibers produced thereby. Suitable fiber stock can also be obtained from pulp screenings, repulped newspapers and agricultural wastes such as corn stalks, sugar cane, straw, flax and the like. The fiber aggregates are generally obtained in the form of an aqueous slurry which frequently contains a mixture of one or more of the foregoing types of fibers.

In a representative mode of operation utilizing a wet felting process for the production of fiber board, a slurry is prepared by stirring a cellulose fiber aggregate into an aqueous solution of a waste sulfite liquor. Usually, this slurry contains from about 4 to about 8 percent of cellulose. Having thus prepared a fiber slurry, a ligninous binder is precipitated in situ on the fibers by the addition of a polymeric alkylene polyamine and the addition of a mineral acid, if necessary, to adjust the pH to about 4.

Normally an aqueous solution of a waste sulfite liquor is characterized by a pH in the range from 2.5 to 6, but should a neutralized or alkyline liquor be used, it is necessary to acidify the slurry solution either before or preferably, after the addition of the polymeric alkylene polyamine, with sufficient mineral acid to decrease the pH to a point within the above range. Sufficient amounts of the waste sulfite liquor and polymeric alkylene polyamine are employed to provide a ligninous binder content ranging from about 5 to about 15 weight percent of the ultimate dry fiber mat. It should be understood that, in addition to the foregoing suggested concentration range of the ligninous binder, that an improvement in board strengths and weathering properties can be achieved by employing the ligninous binder of the present invention in quantities ranging from about 1 to as much as about 40 percent or more by weight of the cellulose fibers.

Next, a mat of the cellulose fiber-ligninous binder composite is formed from the slurry on a felting screen which retains the fibers and ligninous precipitate while permitting the liquid to drain off. The mat is then ready for molding and curing at suitable thermosetting temperatures. Pressures applied vary according to the desired final product density. Fiber board densities vary from 15 to 26 pounds per cubic foot for softboard, 26 to 50 pounds per cubic foot for wallboard and 50 to 80 pounds per cubic foot for hardboard.

Curing of the ligninous binder in the fiber-binder composite can be accomplished by heating the fiber-binder composite to temperatures from about 200° to 450° F. Frequently it is desirable to cure at these temperatures for a period of time sufficient to reduce the moisture content of the board to at least about 20 and preferably about 6 to 10 percent based on the wood fiber. The exact cure time is a variable dependent upon factors as would be apparent to one skilled in the art such as, for example, the thickness and density of the fiber mat to be cured, the temperature that is to be employed and the heat transfer efficiencies that are realized.

In large scale operations, the felting and curing processes are generally carried out in a continuous operation. Having once prepared a suitable fiber slurry, which has incorporated therein the desired quantity of the ligninous binding precipitate of the present invention, the subsequent mat-forming or felting operations and the molding and curing thereof can be carried out in a conventional manner such as any of the ways described in Stamm and Harris, Chemical Processing of Wood, pages 352–360, Chemical Publishing Company, Inc., New York, New York (1953).

The following examples are illustrative of the present invention but should not be construed as limiting.

*Example 1*

A polymeric alkylene polyamine was prepared by means of a condensation reaction between about equimolar proportions of ethylene dichloride and a polyamine mixture that consisted of about 80 percent by weight of diethylene triamine, 10 percent by weight of triethylene tetramine and 10 percent by weight of higher homologous polyamines. In this instance, 1510 grams of water and 1620 grams of the above polyamine mixture were charged into a two-gallon stainless steel reaction vessel equipped with a reflux condenser. Ethylene dichloride was then added to the reaction mixture at such a rate as to just maintain reflux until 1390 grams had been added. After all of the ethylene dichloride had been added, the mixture was heated at about 100° C. for 6 hours and then at 125° C. for an additional 6 hours. At this point, the conversion of the reactant was determined by means of a Volhard titration for $Cl^-$ to be 93.5 percent. The resulting polymeric alkylene polyamine product was diluted with water to 67 percent solids and employed as follows:

A slurry was prepared from 280 grams of wood fibers, 300 cc. of calcium base waste sulfite liquor which contained approximately 10 percent lignosulfonic acid and 4.5 gallons of hot water. After thoroughly mixing the above ingredients, 4.0 grams of the above-prepared polymeric alkylene polyamine diluted in one-half gallon of water were added to the slurry with stirring. Also mixed into the slurry were 0.5 gram of paraffin wax and 0.75 gram of alum. A fiber mat was then prepared by the wet felting process which consisted of passing the fiber-binder slurry onto a screen upon which the cellulose fiber-binder composite was collected as the slurry liquid drained off.

Four 10 by 12 inch fiber mats were thus formed and dried at room temperature to a 6 percent residual moisture content. The mats were pressed at approximately 150 p.s.i. for about 1½ minutes at 400° F. and the press was released to allow steam to escape. The mats were again pressed to approximately 650 p.s.i. for about 10 minutes at 400° F. The hardboard thus produced was conditioned to a constant moisture content and cut into 2 by 5 inch test samples.

In a manner similar to the foregoing procedure, a control hardboard was prepared from 280 grams of the same wood fiber, 0.5 gram of paraffin wax and 0.75 gram of alum but without any of the precipitate-forming additives. A comparison of the modulus of rupture (MOR) obtained for the two boards identically prepared except for the absence of binder in the control showed an increase in the MOR for the board containing the binder of 38.4 percent. The modulus of rupture is defined by the equation.

$$MOR = \frac{3PL}{2bd^2}$$

wherein P is the maximum load at the point of rupture in pounds, and L, $b$ and $d$ are, respectively, the span, width and thickness of the specimen in inches. The foregoing test data was obtained in substantial accordance with ASTM testing procedures: D–1037–56T, Part 6, ASTM Standards, page 81 (1958).

*Example 2*

A series of wet felting slurries were prepared for the manufacture of softboard in a manner similar to that of the foregoing example.

The waste sulfite liquor that was employed was a concentrated calcium base liquor of which a representative sample contained 51 percent soluble solids which includes about 6 percent total sulfur, about 20 percent reducing sugars and a balance of substantially lignosulfonic acids. It had a specific gravity of about 1.28 and was characterized by a pH of 3.4. The polymeric alkylene polyamines were prepared in a manner identical to that of the foregoing example.

The slurry for Run A contained 25 liters of a 4 percent cellulose fiber slurry, 160 milliliters of the waste sulfite liquor and 16 milliliters of a 67 percent solids solution of the polymeric alkylene polyamine. The slurry for Run B contained 25 liters of a 4 percent cellulose fiber slurry, 240 milliliters of the waste sulfite liquor and 24 milliliters of a 67 percent solids solution of the polymeric alkylene polyamine. Wet felted fiber mats were then prepared from these fiber-binder slurries by passing them onto a screen which permitted the liquid medium to drain off. The mats thus prepared were then dried to about 6 percent residual moisture and cured at 350° F. for 20 minutes.

In Run C 25 liters of a 4 percent cellulose slurry were mixed with 200 milliliters of the waste sulfite liquor and 20 milliliters of a 67 percent solids solution of the polymeric alkylene polyamine. In this instance, however, the pH of the fiber slurry was increased to about 10 by the addition of sodium hydroxide before the addition of the polymeric alkylene polyamine. At this pH, the lignosulfonic acids became the corresponding water-soluble sodium salts and the polymeric alkylene polyamine dissolved in the slurry solution without causing the formation of a precipitate. After thorough mixing, the slurry was acidified with sulfuric acid to a pH of 4.5 thereby obtaining a ligninous binder in situ on the cellulose fibers of the slurry. A fiber mat was then prepared and cured in accordance with the method employed for Runs A and B.

In addition to the foregoing test boards, a control board was prepared without a binder.

The softboards thus prepared in the foregoing runs were tested in accordance with ASTM procedures specified in Example 1. The averaged results for three test specimens for each of the specified runs are reported in Table 1.

TABLE 1

| Run | Breaking Load (lbs.) | Load at Proportional Limit (lbs.) | M.O.R. (lbs./in.$^2$) | Specific Gravity |
| --- | --- | --- | --- | --- |
| Control | 31.0 | 21 | 238 | 0.26 |
| A | 61.5 | 52 | 453 | 0.29 |
| B | 76.3 | 63 | 553 | 0.31 |
| C | 82.3 | 70 | 601 | 0.31 |

We claim:
1. A process comprising the steps of forming an aqueous slurry of cellulose fibers; incorporating therein sufficient waste sulfite liquor to provide from about 1 to about 50 percent by weight of lignosulfonic acid and from about 0.05 to about 20 percent by weight of a water-soluble polymeric alkylene polyamine, the weight percentages being based on the weight of the cellulose fibers and the slurry-mixture being characterized by a pH within the range from about 8 to 10; adjusting the pH of the slurry-mixture to within the pH range from about 2.5 to about 6 by the addition of a mineral acid, whereby a binder precipitate is formed in situ; forming a wet felted mat from the fiber-binder slurry thus prepared; and heating such mat at a temperature from about

200° to about 450° F. for a period of time sufficient to cure the binder.

2. The process described in claim 1 wherein the polymeric alkylene polyamine is the reaction product of a dihalogenated lower alkylene and a polyamine having the formula

wherein $n$ is an integer from 2 to 3 and $x$ is an integer from 2 to 6.

References Cited by the Examiner
UNITED STATES PATENTS

| | | | |
|---|---|---|---|
| 2,297,635 | 9/1942 | Schorger | 162—163 |
| 2,534,908 | 12/1950 | Holzer | 162—158 |
| 2,683,706 | 7/1954 | Muller | 260—124.3 |
| 2,839,417 | 6/1958 | Tousignant et al. | 106—123 |
| 2,846,431 | 8/1958 | Goss | 162—163 |
| 2,930,106 | 3/1960 | Wrotnowski | 117—65 X |

DONALL H. SYLVESTER, *Primary Examiner.*

JOSEPH B. SPENCER, RICHARD D. NEVIUS, MORRIS O. WOLK, *Examiners.*